United States Patent Office 3,357,969

Patented Dec. 12, 1967

3,357,969
MONOAZO DYES

Milton Green, Newton Centre, Helen P. Husek, Lincoln, and Sidney Kasman, Newton, Mass., assignors to Polaroid Corporation, Cambridge, Mass., a corporation of Delaware No Drawing. Filed Jan. 23, 1964, Ser. No. 339,615
8 Claims. (Cl. 260—199)

This application is in part a continuation of our copending U.S. application Ser. No. 75,127, filed Dec. 12, 1960 and now abandoned, which in turn is in part a continuation of application Ser. No. 709,005, filed Jan. 15, 1958 and now abandoned.

This invention relates to chemistry and, more particularly, to novel chemical compounds and specified processes for the syntheses thereof.

A principal object of the present invention is to provide certain specified novel chemical compounds.

Another object of the present invention is to provide certain specified syntheses for preparing the novel compounds of the present invention.

Other objects of this invention will in part be obvious and will in part appear hereinafter.

The invention accordingly comprises the process involving the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description.

This invention is concerned with certain dyes within the general formula:

(1) $$D[-N(R)-C(=O)-(alkylene)_n-Z]_a$$

wherein R represents hydrogen or an alkyl group, preferably a lower alkyl group comprising from 1 to 5 carbon atoms, inclusive, for example, methyl, ethyl, etc.; Z represents a benzenoid developing group, preferably comprising an aryl group selected from the group consisting of benzene and naphthalene nuclei substituted by at least two groups selected from the group consisting of hydroxyl and amino groups, at least one of said groups being substituted in one of ortho and para positions with respect to one other of said groups; $n$ is 0 or 1; $a$ is 1 or 2; D represents the radical of a dye molecule

D[—R $$D[-N(R)-H]_a$$

wherein R and $a$ have the same significance as previously noted; specifically dyes of the formula:

(2) $$Z\text{-}(alkylene)_n\text{-}C(=O)-N(R)-Ar(W)-N=N-A(-N=N-A^1)_p$$

wherein each of A and $A^1$ comprises the nucleus of a diazotizable aromatic primary amine, for example, of the benzene, naphthalene, diphenyl, or heterocyclic series, e.g., pyrozolone or thiazole series, each of which nuclei may be the same or different; Ar is an arylene group, preferably of the benzene or naphthalene series, which arylene group may be further substituted, as for example, by alkyl, halogen, alkoxy, acid (e.g., carboxyl, sulfo, etc.), sulfonyl, acyl, or amino groups, provided that said Ar is unsubstituted in one of the ortho or para positions to said W substituent and said further substituents do not hinder coupling of said Ar with a diazonium salt of said A substituent; W is a primary amino, a secondary amino, a tertiary amino, or a hydroxyl group, in ortho or para positions with regard to the azo group; $p$ is 0 or 1; and Z, $n$, and R have the same significance as previously noted.

As illustrations of suitable amines from which A and $A^1$ may be derived, mention may be made of any amine of the benzene, naphthalene, diphenyl or heterocyclic series, which is capable of diazotization. Where a disazo compound is desired, i.e., where $p$ is 1 in the above formula, any diazotizable amine of the azobenzene, azonaphthalene, or azoheterocyclic series, as well as azo compounds containing dissimilar nuclei, may be employed in the practice of this invention. The nucleus may be unsubstituted or it may be substituted in any or all positions by any monovalent group, such as for example, hydroxy, alkyl, aryl, aryloxy, halogen, nitro, sulfonyl, acid, acyl, cyano and others. As representative of the many diazotizable amines which can be used as the diazo component in the process of this invention, mention may be made of: 3-nitro-4-chloro-aniline, 2-nitro-4-amino-toluene, 2-chloro-4-aminophenetole, 2-nitro-benzidine, dianisidine, thioaniline, 4,4'-diamino-benzophenone, benzidine-sulfone, β-amino-anthraquinone, 2-amino-benzothiazole, 2-amino-6-ethoxy-benzothiazole, 5-amino-quinoline, 6-amino-quinoline, ortho-, meta- and para-toluidines, -xylidines, -anisidines and -phenetidines, ortho-, meta- and para-chloro-(and -bromo-) anilines, 4-chloro-2-amino-toluene, chloro-anisidines and -phenetidines, nitro-toluidines and anisidines such as 2-nitro-4-amino-toluene and 2-nitro-4-amino-anisol, amino-phenyl-sulfones such as 4-amino-phenyl-methyl-sulfone, 3-amino-phenyl-ethyl-sulfone and 4-amino-diphenyl-sulfone, m- and p-amino-acetanilide, 2-, 3- and 4-amino-diphenyl, 2-, 3- and 4-amino-diphenyl ether, o-, m- and p-amino-phenyl-sulfon-dimethylamide, o-, m- and p-amino-benzamide, 2,5-dimethoxy-aniline, α-naphthylamine, aniline, 5-amino-1,2,4-triazol, 2-phenyl-4,5-diamino-triazol, 1-phenyl-5-amino-triazol, 5-amino-tetrazol, 4,4'-diaminoazobenzene, 4-amino-1,1'-azobenzene, 4-amino-5-pyrazolone; 4-amino-3-methyl-1-phenyl-5-pyrazolone; 4-amino-3-carbethoxy-1-phenyl-5-pyrazolone, thiazoles, such as 2-amino-5-nitro-thiazole, etc.

It will be recognized from the foregoing description that the nucleus of the diazotizable aromatic amine may possess one or more substituents, such as, for example, alkyl, alkoxy, acid (e.g. carboxyl, sulfo, etc.) sulfonyl, acyl, nitro, substituted amino (e.g. acylamino, alkylamino, etc.) halogen, etc., groups according to the properties desired in the resultant azo dye.

The term "alkylene" as set forth in the generic formula is intended to include both straight and branched chain type alkylene groups and preferably comprises from 1 to 5 carbon atoms, inclusive.

The preferred compounds of this invention are monoazo dyes which may be repersented by the formula:

(3) $$Z\text{-}(alkylene)_n\text{-}C(=O)-N(H)-Ar(W)-N=N-A$$

wherein the designated substituents have the meanings heretofore noted.

The compounds of Formula 1 are disclosed and claimed in the copending U.S. application of Elkan R. Blout, Saul G. Cohen, Milton Green, Howard G. Rogers, Myron S. Simon and Robert B. Woodward, Ser. No. 1,442, filed Jan. 11, 1960 which was abandoned in favor of application Ser. No. 401,714 filed Oct. 5, 1964.

We have discovered that the novel dyes of Formulae 2 and 3 may be prepared by coupling an appropriate diazonium salt into a compound of the general formula:

(4) $$Z_1\text{-}(alkylene)_n\text{-}C(=O)-N(R)-Ar(W)$$

wherein $n$, R, W, and Ar have the same significance as previously noted; and $Z^1$ represents the protected derivative of a benzenoid developing group, preferably the acylated derivative thereof, more preferably an o-bis-acyloxyphenyl or a p-bis-acyloxyphenyl group. The protecting or insulating groups are removed prior to photographic utilization of the dye developers, for example, removal of the acyloxy protective groups of $Z^1$ to effect thereby reconstitution of hydroxyl groups, the removal being accomplished, for example, by hydrolysis in the presence of alkali.

The term "acyloxy" is meant to signify the grouping

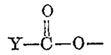

wherein Y is an aryl, alkyl, aryloxy, or alkoxy group. The terms "alkyl" and "aryl" are intended to signify also substituted aryl and alkyl groups, for example, aralkyl and alkaryl groups.

In the preferred embodiment of Formula 4, $Z^1$ is a p-bis-acyloxyphenyl group, e.g. p-bis-cathyloxylphenyl; R is a hydrogen radical; Ar is a benzene nucleus; and W is a tertiary amino group.

The compounds of Formula 4 are disclosed and claimed in the copending U.S. application of Milton Green, Helen P. Husek and Sidney Kasman, Ser. No. 200,639, filed June 7, 1962, as a continuation-in-part of Ser. No. 709,001, filed Jan. 15, 1958 and now abandoned.

Compounds within Formula 2, wherein *p* is 1, may be prepared by employing a diazonium salt, which is an azo coupling component or coupler, in the above-mentioned diazotization, and coupling a diazonium salt into this coupling component. The aforementioned aromatic primary amino couplers posses a free position ortho or para to a hydroxyl, secondary amino, or tertiary amino group.

The preferred compound within Formula 4 comprises:

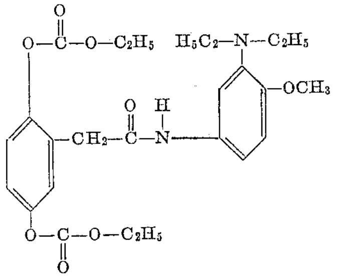

5-(2',5'-bis-cathyloxyphenylacetamido)-2-methoxy-N,N-diethylaniline

As examples of further compounds within the scope of Formula 4, mention may be made of:

p-(2,5-bis-cathyloxyphenylacetamido)-aniline;
4 - (2',5' - bis-cathyloxyphenylacetamido)-2,5-diethoxy-aniline;
3 - (2',5'-bis-cathyloxyphenethylacetamido)-N,N-diethyl-aniline;
3 - (2',5' - bis-cathyloxyphenethylcarboxamido)-N,N-diethylaniline;
3 - (2',5' - bis-cathyloxyphenylacetamido)-N,N-diethyl-naphthylamine;
3 - acetamido - 6 - (2',5'-bis-cathyloxyphenylacetamido)-N,N-diethylaniline;
3 - acetamido - 5-(2',5'-bis-cathyloxyphenylacetamido)-N,N-diethylaniline;
2 - acetamido - 5 - (2',5'-bis-cathyloxyphenylacetamido)-N,N-diethylaniline;
2 - (2',5' - bis - cathyloxyphenylacetamido)-5-methylsulfonyl-N,N-diethylaniline;
3 - (2',5' - bis-cathyloxyphenylacetamido)-5-methylsulfonyl-N,N-diethylaniline;
p-(2,3-bis-cathyloxy-4-methoxy-hydrocinnamido)-aniline;
p-(2,5-bis-cathyloxybenzamido)-aniline;
4-(2',5'-bis-cathyloxyphenylacetamido)-1-naphthol;
8-(2',5'-bis-cathyloxyphenylacetamido)-2-naphthol;
4 - (2',5' - bis - cathyloxy-α-methyl-hydrocinnamido)-1-naphthol; and
2 - amino - 4 - (2',5' - bis - cathyloxyphenylacetamido - naphthalene.

As examples of novel dyes within Formula 3, mention may be made of the following compounds:

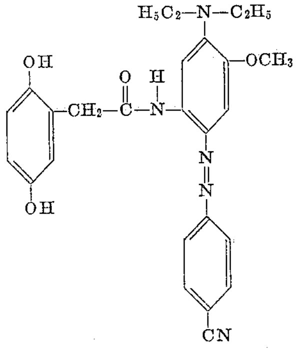

4-(p-cyanophenylazo)-5-homogentisamido-2-methoxy-N,N-diethylaniline

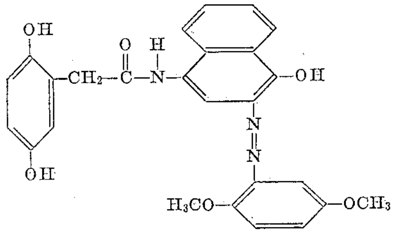

2-(2',5'-dimethoxyphenylazo)-4-homogentisamido-1-naphthol

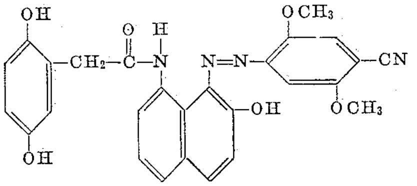

1(4'-cyano-2',5'-dimethoxyphenylazo)-8-homogentisamido-2-naphthol

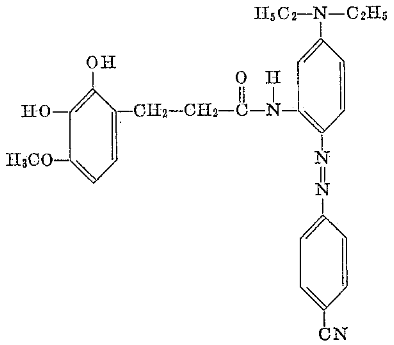

4-(p-cyanophenylazo)-5-(2',3'-dihydroxy-4'-methoxy-hydrocinnamido)-2-methoxy-N,N-diethylaniline

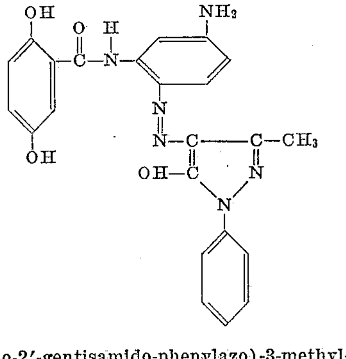

4-(4'-amino-2'-gentisamido-phenylazo)-3-methyl-1-phenyl-5-pyrazolone

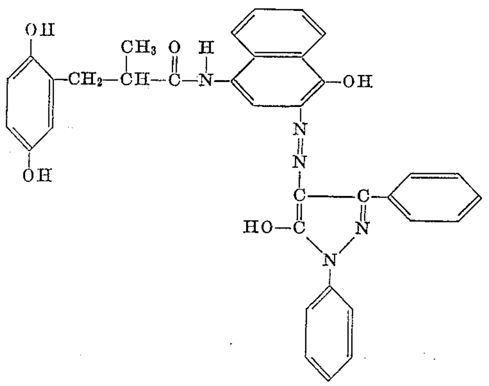

4-(4'-[2'',5''-dihydroxyphenyl - $\alpha$ - methyl-hydrocinnamido]-1'-hydroxy-2'-naphthylazo)-1,3-diphenyl-5-pyrazolone

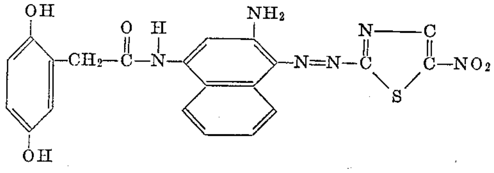

2-(2'-amino-4'-homogentisamido-naphthylazo)-5-nitrothiazole

One method of preparing the compounds of Formula 4 comprises condensing a compound of the formula:

(5)

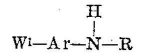

wherein R and Ar have the same significance as noted in Formula 4 and $W^1$ is a hydroxyl, a nitro, or a tertiary amino group; with a compound of the formula:

(6)

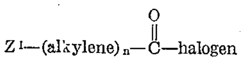

wherein *n* and $Z^1$ have the same significance as noted in Formula 4.

The product of the aforementioned reaction wherein $W^1$ is a nitro group may be directly reduced to yield a compound where $W^1$ is a primary amino group which, in turn, may be converted to a secondary amino group by conventional procedures.

The preferred halogen component of Formula 6 is chlorine.

The hydroxyl-protected derivatives of the ortho- and para-dihydroxyphenyl groups represented by the term "$Z^1$" in Formula 6 may be prepared by esterification of the ortho- or para-dihydroxyphenyl group. After reaction, and prior to use in a photographic developing process, the protective groups may be removed by deesterification, such as, for example, by hydrolysis in the presence of alkali.

In the preferred compounds of Formula 6, the acyloxy protective group of $Z^1$ are of the formula:

(7)

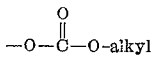

The most preferred protective group of Formula 7 is cathyloxy, as noted heretofore with regard to the preferred compounds of Formula 4.

The preferred compounds of Formula 6 may be prepared by reacting the corresponding lactone, e.g., the lactone of an acid of the formula:

(8) $Z\text{-(alkylene)}_n\text{-COOCH}$ with an alkyl chloroformate such as ethyl chloroformate in the presence of alkali to form the corresponding acid of the formula:

(9) $Z^1\text{-(alkylene)}_n\text{-COOCH}$ wherein $Z^1$ is the protected developing function as shown in Formula 7. As examples of useful lactones, mention may be made of homogentistic acid lactone, 2,5-dihydroxyhydrocinnamic acid lactone, etc.

As is well known in the art the halogen derivative of Formula 6 may be obtained by reacting the free acid with a suitable halogen-containing compound, for example, by reacting the free acid with phosphorus trichloride, phosphorus pentachloride, thionyl chloride, etc.

The preparation of compounds within the scope of Formula 6 is also disclosed in application Serial No. 678,-440, filed August 15, 1957 in the name of Myron S. Simon and now abandoned.

In a preferred embodiment of the synthesis of the novel compounds of Formulate 2 and 3, compounds of the general formula:

(10)

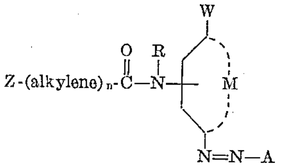

wherein Z, *n*, R, A, and W have the same significance as previously noted and M represents the carbon atoms necessary to complete an aryl ring, preferably of the benzene or naphthalene series; may be synthesized by coupling a diazonium salt with a compound of the general formula:

(11)

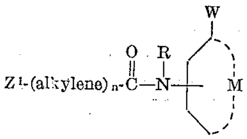

wherein $Z^1$, *n* R, W and M have the same significance as previously noted, said coupling occurring on the aryl nucleus at an unsubstituted position para in respect to W; and removing the protecting groups of $Z^1$, for example acyloxy groups, by hydrolysis in the present of alkali subsequent to completion of the couping reaction.

Where both the ortho and para positions are unsubstituted on the nucleus, coupling occurs almost exclusively in the para position. However, although there is a marked preference for para substitution, coupling occurs in the unsubstituted ortho position if said para position is substituted.

Where it is desired to separate respective ortho and para coupled products, this may be accomplished by suitable methods known to the art. For many purposes, separation of a mixture or ortho and para coupled products may be unnecessary.

It must be noted that coupling of a diazotizable amine into the compounds of Formulae 2 and 3 wherein W is an amino group is preferably performed in an acid medium; however, where W is a hydroxyl group and coupling is preferably performed in an alkaline medium, care must be observed that the pH of the reaction mixture does not attain a value such that the protective derivatives of the dihydroxyphenyl group may be hydrolyzed off prior to the coupling reaction.

It will be noted that prior to the present invention, compounds within the scope of Formula 1 were prepared by coupling a compound of Formula 6 with a complete azo dye to provide the desired compound. As distinguished from this prior synthesis, the novel synthesis described above, e.g., wherein a diazonium salt is coupled into a compound of Formula 4 affords the advantages of employing more readily available starting materials which in turn provide an efficient process for obtaining a greater variety of the desired dyes.

The invention will be illustrated in greater detail in conjunction with the following specific examples which set out representative applications of the novel products and processes of this invention, which, however, are not limited to the details therein set forth and are intended to be illustrative only.

*Example 1*

To prepare 2,5-bis-cathyloxyphenylacetic acid, 1.6 gm. (0.04 mole) of sodium hydroxide was dissolved in 25.0 cc. of water, deoxygenated with nitrogen and then 1.5 gm. (0.01 mole) of homogentisic acid lactone was added thereto. The yellow to yellow-brown solution was cooled by an ice bath and 4.34 gm. (0.04 mole) of ethyl chlorocarbonate was gradually added to the solution with constant stirring. The resultant solution exhibited a pH of 6. Upon the addition of a pellet of sodium hydroxide the solution exhibited a pH of 8 to 9. A small amount of ethyl chlorocarbonate was then added to the solution to insure complete reaction. To the resultant solution exhibiting an approximate pH of 7, was added a 10% hydrochloric acid solution until a pH of 4 was attached and precipitation completed. The resultant precipitate, 2,5-bis-cathyloxyphenylacetic acid, and "oily" residue, was dissolved in ethyl ether, the aqueous filtrate extracted with ethyl ether and the combined ethyl ether solutions extracted with a 10% sodium bicarbonate solution. The acid was precipitated from the sodium bicarbonate solution with a 10% hydrochloric acid solution, dissolved in ethyl ether, washed with water, and dried with anhydrous magnesium sulfate. Evaporation yielded 2.55 gm. of white crystalline 2,5-bis-cathyloxyphenylacetic acid, M.P. 93.5 to 97° C. Recrystallization from a benzene/hexane mixture yielded 2.15 gm. of said product, M.P. 96.4 to 97.2° C. Further purification by a second recrystallization from a benzene/hexane mixture yielded white "needles" of the pure acid, M.P. 96.5 to 97.4° C.

Analysis of the product; Calculated, percent: C, 53.8; H, 5.1. Found, percent: C, 53.8; H, 5.1.

To prepare 2,5-bis-cathloxyphenylacetyl chloride, 20.0 gm. (0.064 mole) of 2,5 bis-cathyloxyphenylacetic acid (prepared as above) and 88.0 cc. (1.23 mole) of thionyl chloride were refluxed 1.5 hours. The excess thionyl chloride was removed in vacuo. The residual oil, 2,5-dicathyloxyphenylacetyl chloride, was dissolved in 25.0 cc. of dry benzene and filtered. The clear light brown filtrate was diluted with 200.0 cc. of hexane, forming a gum-like material which separated from the solution. Upon chilling in an acetone-Dry Ice bath with agitation, the "gum" material crystallized and was filtered. The precipitate was wash with dry hexane and dried in a desiccator containing potassium hydroxide and phosphoric anhydride. 19 gm. of 2,5-bis-cathyloxyphenylacetyl chloride was obtained, M.P. 51 to 53° C., having the following structural formula:

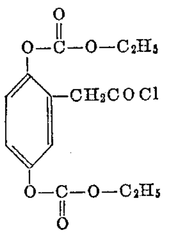

*Example 2*

A mixture of 84.0 gm., 2-methoxy-5-nitro-aniline, 164.0 gm. (85.0 ml.) ethyliodide, 83.5 gm. sodium carbonate, 200.0 ml. of 95% alcohol and 50 ml. of water was refluxed for 42 hrs. The mixture was distilled under vacuum to remove the alcohol, diluted with 200.0 ml. water, and extracted with chloroform. The extract was dried with anhydrous magnesium sulfate, filtered, and distilled. A crude yield of 100.9 gm. was obtained, B.P. 153 to 156° C. at 1.45 mm. pressure. This product was treated with 100.0 ml. acetic anhydride and three drops of concentrated sulphuric acid. After 20 minutes, 100.0 ml. absolute alcohol was added and the solution was boiled free of ethyl acetate and alcohol. The residue was distilled at 1.0 mm. pressure to yield 86.3 gm. of 2-methoxy-5-nitro-N,N-diethylaniline. A solution of 56.0 gm. of this compound in 100.0 ml. of acetic acid was hydrogenated over a 10% palladium charcoal catalyst until the calculated hydrogen was absorbed. The catalyst was centrifuged out and the solution was distilled at 0.8 to 1.0 mm. pressure. The crude product (31.4 gm., 64.8%) distilled over at 134.5 to 137° C. and was initially colorless but rapidly turned brown on exposure to air. This product was redistilled into a receiver containing a trace of hydroquinone to obtain 29.15 gm. of 5-amino-2-methoxy-N,N-diethylaniline. A solution of 9.7 gm. of this last-named compound and 50.0 ml. dry benzene was added to a mixture of 17.6 gm. of 2,5-bis-cathyloxyphenylacetyl chloride (prepared as in Example 1) and 100.0 ml. of dry benzene. The mixture was refluxed one hour with exclusion of moisture and then let stand. A dense oil layer crystallized spontaneously and a white crystalline solid was filtered off, rinsed with dry benzene and vacuum dried, to yield 25.15 gm. of 5-(2',5'-bis-cathyloxyphenylacetamido)-2-methoxy-N,N-diethylaniline. 0.59 gm. of p-cyanoaniline (0.005 mole) was dissolved in 7.5 cc. of water and 1.5 cc. of concentrated hydrochloric acid (0.018 mole). The p-cyanoaniline was diazotized at 5° C. by the addition with constant stirring of 0.35 gm. of sodium nitrite (0.005 mole) in 2 cc. of water. The resultant diazo solution was then added at 5 to 10° C. with constant stirring to a solution of 2.49 gm. of 5-(2',5'-bis-cathyloxyphenylacetamido) - 2 - methoxy - N,N - diethylaniline hydrochloride (0.0047 mole) prepared in the aforementioned manner, in 10 cc. of pyridine. The resultant solution was stirred for 10 minutes at 5° C. and 50 cc. of water was added dropwise. A crystalline precipitate formed which was filtered, washed with water and dried under vacuum. The crystalline product,

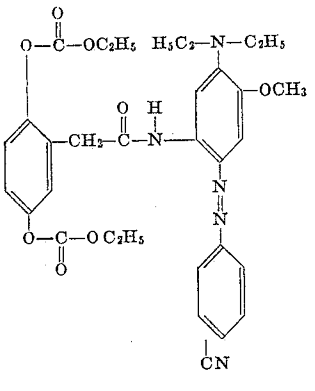

5 - (2',5' - bis - cathyloxyphenylacetamido) - 4 - (p-cyanophenylazo)-2-methoxy-N,N-diethylaniline, a brick red solid, M.P. 100 to 102° C., formed a scarlet colored solution in acetone, the spectral absorption curve of which exhibited a $\lambda_{max.}$ at 515 m$\mu$; $\epsilon=25,800$.

*Example 3*

2.05 gm. of 5-(2',5'-bis-cathyloxyphenylacetamido)-4-(p-cyanophenylazo) - 2 - methoxy - N,N - diethylaniline, prepared in Example 2, was suspended in 30.0 cc. of 95% ethanol. 2.0 gm. of potassium hydroxide (0.0357 mole) was dissolved in 7.5 cc. of water, deaerated, added to the alcohol suspension, warmed, and agitated for 10 minutes. 2.05 cc. of acetic acid (0.037 mole) was added, the mixture cooled and resultant precipitate filtered, washed with water and dried. The product,

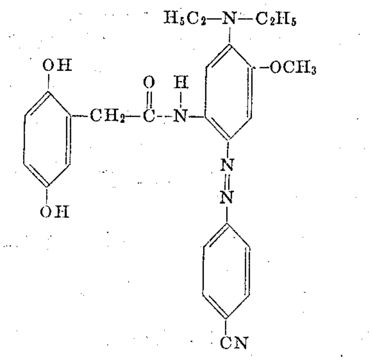

4 - (p - cyanophenylazo) - 5 - homogentisamido - 2-methoxy-N,N-diethylaniline, a brownish-red solid, M.P. 183 to 185° C., exhibited a spectral absorption curve which showed a $\lambda_{max.}$ at 515 m$\mu$ in acetone; $\epsilon$=28,400.

*Example 4*

2.0 gm. of 4-amino-1-naphthol hydrochloride, 3.6 gm. of 2,5-bis-cathyloxyphenylacetyl chloride (as prepared in Example 1), 60 ml. of dry benzene, and 1.7 ml. of pyridine was refluxed under nitrogen for 1½ hrs. The hot solution was clarified with Celite to remove some insoluble gummy brown material and the clear yellow filtrate was precipitated with hexane. The white solid precipitate was washed with hexane to yield 2.5 gm. (dry weight) of 4-(2',5'-dicathyloxyphenylacetamido)-1-naphthol. A mixture comprising 0.92 gm. of 2,5-dimethoxyaniline, 0.48 cc. of 12.5 N hydrochloric acid, and 20 cc. of water was heated until solution, cooled, and acidified with 1.92 cc. of 12.5 N hydrochloric acid. The solution was diazotized at 5° C. with a solution comprising 0.4 gm. of sodium nitrite and 10 cc. of water. The pH of the diazonium mixture was raised to range of 5 to 6 with 2.5 gm. of sodium acetate and 10 cc. of water. The diazonium solution was then added at 15° C., over a time interval of one hour, to a mixture comprising 2.5 gm. of 4-(2',5'-bis-cathyloxyphenylacetamido)-1-naphthol (as prepared above), 150 cc. of alcohol, 100 cc. of a saturated solution of sodium carbonate, and 20 cc. of pyridine. The resultant slurry was stirred for two hours, acidified with acetic acid, and filtered. The filter cake,

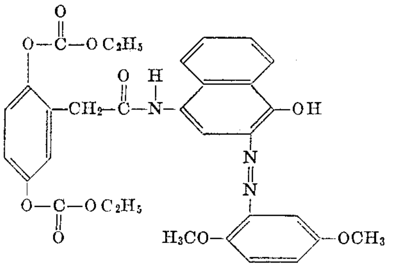

4 - (2',5' - dicathyloxyphenylacetamido) - 2 - (2',5' - dimethoxyphenylazo)-1-naphthol, was washed with water.

*Example 5*

A mixture comprising the product of Example 4, 3.0 gm. of potassium hydroxide, 40 cc. of alcohol, and 10 cc. of water was heated, in vacuo, for three minutes, chilled, and filtered into dilute hydrochloric acid. The acid solution was filtered and the filter cake washed with water and dried. The product,

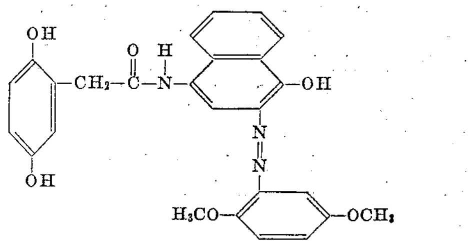

2 - (2',5' - dimethoxyphenylazo) - 4 - homogentisamido-1-naphthol, exhibited a $\lambda_{max.}$ at 535 m$\mu$ in ethanol; $\epsilon$=7500.

*Example 6*

A mixture comprising 2.4 gm. of Fast Bordeaux Salt BD, 4-cyano-2,5-dimethoxy-phenyldiazonium chloride, was slurried in water and added to 2.4 gm. of 8-(2',5'-bis-cathyloxyphenylacetamido)-2-naphthol, and 30 cc. of pyridine. The mixture was stirred for 3 hours and the slurry filtered. The filter cake,

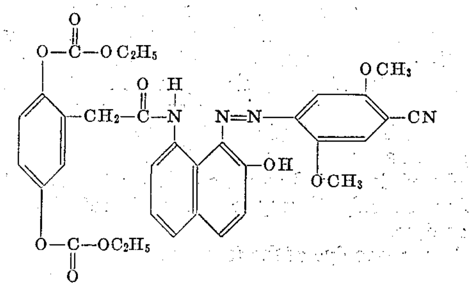

1 - (4' - cyano - 2',5' - dimethoxy-phenylazo) - 8 - (2',5'-bis-cathyloxyphenylacetamido)-2-naphthol, was washed with water.

*Example 7*

A mixture comprising the product of Example 5, 2.6 gm. of potassium hydroxide, 35 cc. of alcohol, 15 cc. of water was warmed, in vacuo, for three minutes. The mixture was cooled, acidified with dilute hydrochloric acid, and filtered. The filter cake was washed with water, dissolved in hot methyl cellosolve, and clarified. The product was precipitated by cooling and the addition of a small amount of water. The material was separated by filtration, washed with water, and dried. The dried product was slurried with alcohol and dried. The product,

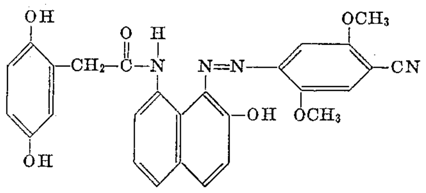

1 - (4' - cyano - 2',5' - dimethoxyphenylazo) - 8 homogentisamido-2-naphthol, exhibits a $\lambda_{max.}$ at 538 m$\mu$ in pyridine, $\epsilon$=21,000.

The preferred embodiments of the novel dyes of this invention preferably are alkali-soluble but water-insoluble, i.e., they do not contain any water-solubilizing groups, in which case they are particularly useful in diffusion transfer color processes such as are described and claimed in U.S. Patent No. 2,983,606 issued to Howard G. Rogers.

Where the novel compounds of this invention are water-soluble by virtue of containing such solubilizing groups, useful dyes are provided for dyeing fibres and the like, and the water-soluble dyes may also be used as photographic developing agents in photographic processes which do not involve diffusion transfer.

From the foregoing description and illustrative examples, it will be seen that the present invention provides a novel class of dyes and a novel process for their preparation.

Since certain changes may be made in the above product and process without departing from the scope of the invention herein involved, it is intended that all matter contained in the above description shall be interpreted as illustrative and not in a limiting sense.

What is claimed is:

1. A compound selected from the group consisting of monoazo dyes of the formulae:

(1) 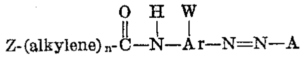

and (2) 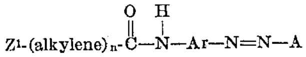

wherein Z is p-dihydroxyphenyl or methoxy-o-dihydroxyphenyl; $Z^1$ is p-dicathyloxyphenyl or methoxy-o-dicathyloxyphenyl; said alkylene moiety contains from 1 to 5 carbon atoms; *n* is 0 or 1; Ar represents an arylene group of the benzene or naphthalene series; W is primary amino, N,N-diethylamino or hydroxyl; and A represents a member of the benzene, pyrazolone or thiazole series; each of said Ar and A having a nitrogen atom of said —N=N— group directly attached to a first nuclear carbon atom, said W being directly attached to a second nuclear carbon atom of said Ar group ortho or para to said first carbon atom of said Ar group attached to said nitrogen atom; said Z moiety providing the only dihydroxyphenyl in said first-named class of dyes and said $Z^1$ being the only dicathyloxyphenyl in said last-named class of dyes.

2. A monoazo dye of the formula:

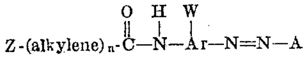

wherein Z is p-dihydroxyphenyl or methoxy-o-dihydroxyphenyl, said Z providing the only dihydroxyphenyl in said dye; said alkylene group contains from 1 to 5 carbon atoms, inclusive; *n* is 0 or 1; Ar represents an arylene group of the benzene or naphthalene series; W is primary amino, N,N-diethylamino or hydroxyl; and A represents a member of the benzene, pyrazolone or thiazole series, each of said Ar and A having a nitrogen atom of said —N=N— group directly attached to a first nuclear carbon atom, said W being directly attached to a second nuclear carbon atom of said Ar group ortho or para to said first carbon atom to which said nitrogen atom is attached.

3. 4 - (p-cyanophenylazo) - 5 - homogentisamido - 2-methoxy-N,N-diethylaniline.

4. 2 - (2′,5′ - dimethoxyphenylazo) - 4 - homogentisamido-1-naphthol.

5. 1 - (4′ - cyano - 2′,5′ - dimethoxyphenylazo) - 8-homogentisamido-2-naphthol.

6. 5 - (2′,5′ - bis - cathyloxyphenylacetamido) - 4 - (p-cyanophenylazo)-2-methoxy-N,N-diethylaniline.

7. 4 - (2′,5′ - dicathyloxyphenylacetamido) - (2′,5′-dimethoxyphenylazo)-1-naphthol.

8. 1 - (4′ - cyano - 2′,5′ - dimethoxyphenylazo) - 8-(2′,5′-dicathyloxyphenylacetamido)-2-naphthol.

References Cited

UNITED STATES PATENTS

| | | | |
|---|---|---|---|
| 3,135,604 | 6/1964 | Green et al. | 260—199 X |
| 3,158,595 | 11/1964 | Green et al. | 260—162 |
| 3,186,982 | 6/1965 | Green et al. | 260—202 |

CHARLES B. PARKER, *Primary Examiner.*

D. M. PAPUGA, *Assistant Examiner.*

BEST AVAILABLE COPY

UNITED STATES PATENT OFFICE

CERTIFICATE OF CORRECTION

Patent No. 3,357,969 Dated December 12, 1967

Inventor(s) Milton Green, Helen P. Husek and Sidney Green

It is certified that error appears in the above-identified patent and that said Letters Patent are hereby corrected as shown below:

Column 11, claim 1, formula 2 should be:

$$--Z^{1}-\ (\text{alkylene})_n-\overset{\overset{O}{\|}}{C}-\overset{\overset{H}{|}}{N}-\overset{\overset{W}{|}}{Ar}-N{=}N-A--.$$

SIGNED AND SEALED
FEB 9 1971

(SEAL)
Attest:

Edward M. Fletcher, Jr.
Attesting Officer

WILLIAM E. SCHUYLER, JR.
Commissioner of Patents